United States Patent [19]

Ibi et al.

[11] Patent Number: 4,687,836
[45] Date of Patent: Aug. 18, 1987

[54] POLYIMIDE ADHESIVES, COATS AND PREPREG

[75] Inventors: Akira Ibi, Mobara; Takushi Sato, Yokohama; Akihiro Yamaguchi, Kamakura; Shigeru Takahashi, Yokohama; Shigeyuki Shishido, Kamakura; Shoji Tamai, Yokohama; Hisai Nakajima, Machida, all of Japan

[73] Assignee: Mitsui Toatsu Chemicals, Inc., Tokyo, Japan

[21] Appl. No.: 785,996

[22] Filed: Oct. 10, 1985

[30] Foreign Application Priority Data

Oct. 15, 1984 [JP] Japan ................................ 59-214350
Oct. 19, 1984 [JP] Japan ................................ 59-218598

[51] Int. Cl.$^4$ .......................................... C08G 73/10
[52] U.S. Cl. .................................. 528/353; 528/229; 528/208; 528/172; 528/226; 528/352
[58] Field of Search .............. 528/353, 229, 208, 172, 528/226, 352

[56] References Cited

U.S. PATENT DOCUMENTS 4,065,345  12/1977  Progar et al. ...................... 524/600
4,094,862   6/1978  Bell ..................................... 528/229

*Primary Examiner*—John Kight
*Assistant Examiner*—M. L. Moore
*Attorney, Agent, or Firm*—Fisher, Christen & Sabol

[57] ABSTRACT

This invention relates to a polyimide powder in use for adhesion and/or coat forming and to a method of preparing said powder, wherein polyamic-acid is chemically imidized which is obtained by reacting tetracarboxylic acid dianhydride with diamine in organic solvents.

This invention further relates to a method for adhesion and coat forming by using said polyimide powder.

This invention still further relates to a method for preparing prepreg by using said polyimide powder, and a method for adhesion and preparing molded laminates by using said prepreg.

14 Claims, No Drawings

POLYIMIDE ADHESIVES, COATS AND PREPREG

BACKGROUND OF THE INVENTION

The present invention relates to a specified polyimide powder useful for the materials of high-temperature stable adhesives, coats, molded parts and composites.

Many kinds of industrial materials which are further excellent in high-temperature properties, are required for high performance and weight saving in the field of electronics, aeronautics and space instruments, and transport machinery. Polyimides are known as improved materials suitable for these applications and are used for structural adhesive, molding materials and composites.

Conventional polyimides, however, are difficult for use, because melt flowability becomes very low in the stage of containing polyimide as a major component after almost cyclization, although the polyamic-acid precursor is flowable when melted.

The melt flowability increases in the presence of solvents or polyamic-acids. Evaperation of the residual solvents or the moisture generated by the cyclization of amic-acid groups, however, causes voids and property reduction, when the solvent removal and imidization is performed in the following step.

National Aeronautics and Space Administration (NASA) has developed new polyimides having improved melt flowability by heat imidizing polyamic-acids which are obtained by reacting tetracarboxylic acid dianhydrides such as 3,3′,4,4′-benzophenone tetracarboxylic acid dianhydride, pyromellitic dianhydride etc., with diamines such as 3,3′-diaminobenzophenone etc. in organic solvents (for example, U.S. Pat. No. 4,065,345 U.S. Pat. No. 4,094,862), and variety of their applications are reported in SAMPE Quarterly, p.20–25(October 1981).

The object of this invention is to provide the polyimides and a method for preparing the same which are further improved in melt flowability and can be widely used for the high-temperature stable adhesives and/or coatings. Another object of this invention is to provide a method for adhesion and coat forming of the polyimides.

Still another object of this invention is to apply said technology and to provide a method for preparing prepreg, bonding by use of said prepreg, and preparing molded laminates of said prepreg.

SUMMARY OF THE INVENTION

The present invention is summarised as follows:

(1) The polyimide powder for adhesion and/or coat forming, which comprises the polyimide powder being obtained by chemically imidizing a polyamic-acid having recurring units of the formula (I):

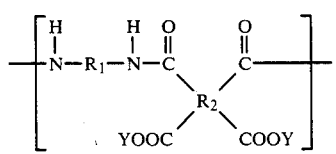

where $R_1$ is selected from the group consisting of

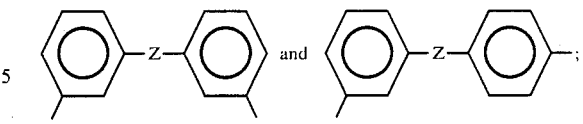

$R_2$ is selected from the group consisting of

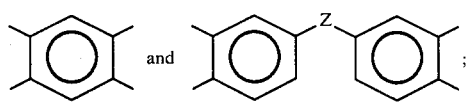

$Z$ is selected from the group consisting of

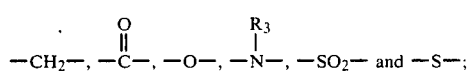

$R_3$ is selected from the group consisting of alkyl and aryl, and Y is selected from the group consisting of hydrogen, alkyl and aryl, with an imidizing agent, and having recurring units of the formula (II):

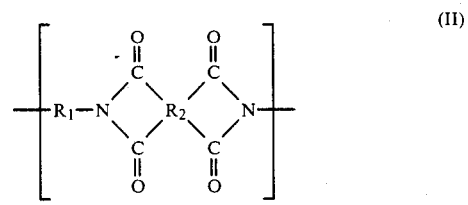

where $R_1$ and $R_2$ are the same as $R_1$ and $R_2$ in the formula (I).

(2) The method for preparing the polyimide powder in use for adhesion and/or coat forming which comprises chemically imidizing a polyamic-acid having recurring units of the formula (I):

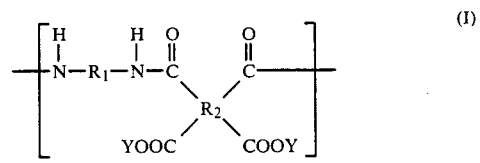

with an imidizing agent to obtain the polyimide powder having recurring units of the formula (II):

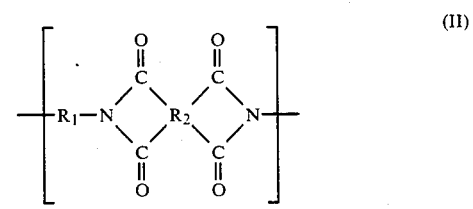

where $R_1$ and $R_2$ are the same as $R_1$ and $R_2$ in the formula (I).

(3) The method of adhesion which comprises applying said polyimide powder to adherend surfaces, assembling together the treated surfaces with untreated or treated surfaces of other adherends, and heating under increased pressure above the glass transition temperature of the polyimide.

(4) The method of forming a polyimide coat which comprises applying said polyimide powder to the substrates, heating and melting above the glass transition temperature of the polyimide.

(5) The method for preparing prepreg of a polyimide powder, which comprises the polyimide powder being obtained by chemically imidizing a polyamic-acid having the recurring units of the formula (III):

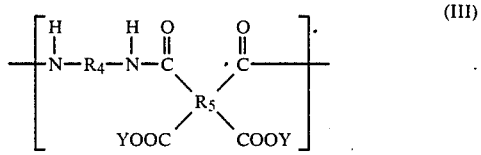

where $R_4$ is a divalent group selected from the group consisting of aliphatic group having two and more carbons, cycloaliphatic group, monoaromatic group, ring condensed polyaromatic group, non-condensed polyaromatic group wherein aromatic rings are connected with a crosslinking function, and heterocyclic group; $R_5$ is a tetravalent group selected from the group consisting of aliphatic group having two and more carbons, cycloaliphatic group, monoaromatic group, ring condensed polyaromatic group, non-condensed polyaromatic group wherein aromatic rings are connected with a crosslinking function, and heterocyclic group; Y is selected from the group consisting of hydrogen, alkyl and aryl groups, with an imidizing agent, and having recurring units of the formula (IV):

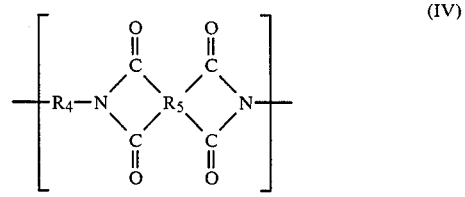

where $R_4$ and $R_5$ are the same as the $R_4$ and $R_5$ of the formula (III), and further including the steps of applying the powder to a fibrous reinforcing material, heating above the glass transition temperature of the polyimide, melting and impregnating the polyimide powder.

(6) The method for preparing molded laminates which comprises piling up said prepreg and heating under increased pressure above the glass transition temperature of the polyimide contained in said prepreg.

(7) The method of adhesion which comprises inserting said prepreg between the adherends and heating under increased pressure above the glass transition temperature of the polyimide contained in said prepreg.

DETAILED DESCRIPTION OF THE INVENTION

Firstly the organic solvent solution of polyamic-acids is prepared in the method of this invention. It is generally obtained with known methods by reacting tetracarboxylic acid dianhydrides with diamines in the polyamic-acid soluble organic solvents. For example, diamines are dissolved or suspended in the organic solvents and tetracraboxylic acid dianhydrides are gradually added in a dry nitrogen atmosphere, or vice versa.

Typical tetracarboxylic acid dianhydrides which are suitable for use in this invention include, for example; pyromellitic dianhydride, 3,3',4,4'-benzophenone tetracaboxylic acid dianhydride, bis(3,4-dicarboxyphenyl)ether dianhydride, bis(3,4-dicarboxyphenyl) sulfone dianhydride, bis(3,4-dicarboxyphenyl)methane dianhydride. Particularly preferred tetracarboxylic acid dianhydride is 3,3',4,4'-benzophenontetracraboxylic acid dianhydride (hereinafter abbreviated as BTDA).

These tetracarboxylic acid dianhydride can be used alone or in mixtures of two or more.

Other tetracarboxylic acid dianhydrides which may be usable for the preparation of prepreg include, for example, 2,3,3',4'-benzophenone tetracarboxylic acid dianhydride, 2,2',3,3'-benzophenone tetracarboxylic acid dianhydride, 4,4',5,5',6,6'-hexafluorobenzophenone-2,2',3,3'-tetracarboxylic acid dianhydride, 3,3',4,4'-biphenyltetracarboxylic acid dianhydride, 2,2',3,3'-biphenyl tetracarboxylic acid dianhyaride, bis(2,3-dicarboxyphenyl)methane dianhydride, bis(2,5,6,-trifluoro-3,4-dicarboxyphenyl)methane dianhydride, 1,1-bis(3,4-dicarboxyphenyl)ethane dianhydride, 2,2-bis(3,4-dicaroboxyphenyl)propane dianhydride, 2,2-bis(2,3-dicaroboxyphenyl)propane dianhydride, bis(2,3-dicarboxyphenyl) ether dianhydride, bis(2,5,6-trifluoro-3,4-dicarboxyphenyl) ether dianhydride, bis(2,5,6-trifluoro-3,4-dicaroboxyphenyl) sulfone dianhydride, bis(3,4-dicarboxyphenyl) phenylphosphonate dianhydride, bis(3,4-dicarboxyphenyl) phenylphosphine oxide dianhydride, N,N-(3,4-dicarboxyphenyl)-N-methylamine dianhydride, bis(3,4-dicarboxyphenyl) diethylsilane dianhydride, bis(3,4-dicarboxyphenyl)-tetramethyl disiloxane dianhydride, (3,3',4,4'-tetracarboxybenzoyloxybenzene dianhydride, 1,4,5,8-naphthalenetetracarboxylic acid dianhydride, 2,3,6,7-naphthalenetetracarboxylic acid dianhydride, 1,2,5,6-naphthalenetetracarboxylic acid dianhydride, 2,6-dichloronapthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, 1,4,5,8-tetrafluoronaphthalene-2,3,6,7-tetracarboxylic acid dianhydride, 1,8,9,10-phenanthrenetetracarboxylic acid dianhydride, 3,4,9,10-perylenetetracarboxylic acid dianhydride, 2,3,4,5-thiophenetetracarboxylic acid dianhydride, 2,3,5,6-pyrazinetetracarboxylic acid dianhydride, 2,3,5,6-pyridinetetracarboxylic acid dianhydride, 3,3',4,4'-azobenzenetetracarboxylic acid dianhydride, 3,3',4,4'-azoxybenzenetetracarboxylic acid dianhydride, 1,2,3,4-cyclopentanetetracarboxylic acid dianhydride, ethylenetetracarboxylic acid dianhydride, butanetetracarboxylic acid dianhydride, tetrahydrofuran-2,3,4,5-tetracarboxylic acid dianhydride. Also in the preparation of prepreg, particularly preferred tetracarboxylic acid dianhydride is 3,3',4,4'-benzophenone tetracarboxylic acid dianhydride (BTDA).

These tetracarboxylic acid dianhydrides are used alone or in mixtures of two or more.

Typical diamines which are suitable for use in this invention include, for example, 3,3'-diaminobenzophenone, 3,4'-diaminobenzophenone, 3,3'-diaminodiphenylsulfone, 3,4'-diaminodiphenylsulfone, 3,3'-diaminodiphenylmethane, 3,4'-diaminodiphenylmethane, 3,3'-diaminodiphenylsulfide, 3,4'-diaminodiphenylsulfide, 3,3'-diaminodiphenylether, and 3,4'-diaminodiphenylether.

3,3'-or 3,4'-diaminocompounds are desired for preparing the polyimide powder having an excellent melt flowability and high adhesive strength. Particularly preferred diamine is 3,3'-diaminobenzophenone (hereinafter abbreviated as 3,3'-DABP).

These diamines can be used alone or in mixtures of two or more.

Other diamines which may be usable for the preparation of prepreg include, for example; o-, m-, and p-phenylenediamine, 2,4-diaminotoluene, 1,4-diamino-2-methoxybenzene, 2,5-diaminoxylene, 1,3-diamino-4-chlorobenzene, 1,4-diamino-2,5-dichlorobenzene, 1,4-diamino-2-bromobenzene, 1,3-diamino-4-isopropylbenzene, 2,2-bis(4'-aminophenyl)propane, 4,4'-diaminodiphenylmethane, 2,2'-or 4,4'-diaminostilbene, 4,4'-diamino-2,2',3,3',5,5',6,6'-octafluorodiphenylmethane, 4,4'-diamino-2,2',3,3',5,5',6,6'-octafluorodiphenylether, 4,4'-diaminodiphenylether, 4,4'-diamino-2,2',3,3',5,5',6,6'-octafluorodiphenylether, 4,4'-diaminodiphenylthioether, 4,4'-diaminodiphenylsulfone, 4-aminophenyl 4-aminobenzoate, 2,2'-, or 4,4'-diaminobenzophenone, 2,3-diaminobenzophenone, 4,4'-diaminobenzil, 4-(4-aminophenylcarbamoyl)aniline, bis(4-aminophenyl) phenyl phosphine oxide, bis(3-aminophenyl) methylphosphine oxide, bis(4-aminophenyl)methylphosphine oxide, bis(4-aminophenyl) cyclohxylphosphine oxide, N,N-bis(4-aminophenyl)aniline, N,N-bis(4-aminophenyl)-N-methylamine, 2,2'-,3,3'-, or 4,4'-diaminoazobenzene, 4,4'-diaminodiphenylurea, 1,8- or 1,5-diaminonaphthalene, 1,5-diaminoanthraquinone, diaminofluoranthene, 3,9-diaminochrysene, diaminopyrene, bis(4-aminophenyl)-diethylsilane, bis(4-aminophenyl) dimethylsilane, bis (4-aminophenyl)tetramethyldisiloxane, 2,6-diaminopyridine, 2,4-diaminopyrimidine, 3,6-diaminoacridine, 2,4-diamino-S-triazine, 2,7-diaminodibenzofuran, 2,7-diaminocarbazole, 3,7-diaminophenothiazine, 5,6-diamino-1,3-dimethyluracil, 2,5-diamino-1,3,4-thiadiazole, dimethylenediamine, trimethylenediamine, tetramethylenediamine, hexamethylenediamine, heptamethylenediamine, octamethylenediamine, nonamethylenediamine, decamethylenediamine, 2,2-dimethylpropylenediamine, 2,5-dimethylhexamethylenediamine, 2,5-dimethylheptamethylenediamine, 4,4-dimethylheptamethylenediamine, 3-methylheptamethylenediamine, 3-methoxyhexamethylenediamine, 5-methylnonamethylenediamine, 1,12-diaminooctadecane, 2,11-diaminododecane, 1, 2-bis(3-aminopropoxy)ethane. Also in the method for preparing prepreg, particularly preferred diamine is 3,3'-diaminobenzophenone (3,3'-BABP).

These diamines are used alone or in mixtures of two or more.

For prepreg, in a range of quantities which have no remarkable effect on properties of the polyimides, N,N'-dialkyl or diaryl substituted diamines are also used in combination. Such diamines include, for example, N,N'-diethylethylenediamine, N,N'-diethyl-1,3-diaminopropane, N,N'-dimethyl-1,6-diaminohexane, and N,N'-diphenyl-1, 4-phenylenediamine.

Organic solvents which are suitable for use in this invention include, for example, N,N-dimethylacetamide, N,N-dimethylformamide, hexamethylphosphoramide, 1,3-dimethyl-2-imidazolidinone, N-methyl-2-pyrrolidone, diethyleneglycol dimethylether and dimethylsulfoxide. Polar non-proton solvents such as N,N-dimethylacetamide are preferred from imidizing reaction procedure. These solvents are used alone or in combination.

The resulting polyamic-acid solution having a polymer content of 2–50% by weight, preferably 4–45% by wlight, or a Brookfield viscosity of 10–50,000 centipoises, preferably 50–40,000 centipoises, is suitable for the easiness on handling.

Polyamic-acids themselves having an inherent viscosity of a range of 0.1–3.0 dl/g, preferably 0.2–2.0 dl/g, are suitable for the mechanical strengths, melt flowability, and high-temperature stability of the polyimides. The inherent viscosity is measured at 35° C. by dissolving 0.5 gram of the polyamic-acid in 100 ml of N,N'-dimethylacetamide.

Secondly, the resulting organic solvent solution of polyamic-acids is reacted with the imidizing agents, which include, for example, acetic acid anhydride, propionic acid anhydride, isobutyric acid anhydride and butyric acid anhydride. The agents are used alone or in mixtures of two or more.

There are generally two processes of chemical imidization. In the first process, the imidizing agents are added into the polyamic-acid solution. In the second process, the polyamic-acid solution is on the contrary added into the imidizing agents. Other processes may also be used.

In the first process, wherein the imidizing agents are added into the polyamic-acid, suitable temperature of addition is $-10°$ C.–150° C. The imidizing agents may directly be added into the polyamic-acids or may also be added after being diluted with the organic solvents. The ratio of imidizing agents to the carboxyl groups of polyamic-acids is 0.8–4 equivalents, and preferably in particular 1–2 equivalents.

The agents may also be added simultaneously with imidizing catalysts. The catalysts include, for example, tertiary amines such as, trimethylamine, triethylamine, tributylamine, pyridine, $\alpha$-picoline, $\beta$-picoline, $\gamma$-picoline, and lutidine. The ratio of the catalysts to the carboxyl groups of polyamic-acids is 0.05–1.5 equivalents and preferably 0.2 1 equivalent.

The imidization proceeds by adding the imidizing agents into the polyamic-acid solution under stirring. After the addition is finished, the stirring is further continued to separate the polyimide. The precipitate is filtered, thoroughly washed with water and/or the organic solvents, followed by drying at elevated temperatures to obtain the polyimide powder.

In the second process wherein the polyamic-acid solution is added into the imidizing agents, the same imidizing agents and catalysts are used as in the first process. When adding the polyamic-acid solution, the imidizing agents are preferably stirred.

The ratio of the imidizing agents to the carboxyl group of polyamic-acid is preferably one equivalent or more. The agents may be diluted with the organic solvents as in the first process. The separated polyimide is treated as in the first process and obtained as powder.

The polyimide causes no difficulty by the presence of residual non-cyclized amic-acid group in the range of quantities which has no effect on the properties, or by the presence of polyimide segments which are not resulted from the chemical imidization.

Residual volatiles in the polyimide powder are preferred to be reduced, because they cause troubles such as generation of blisters in the following stages of molding, bonding or coat forming. The volatiles are normally preferred to be 12% by weight or less.

The resulting polyimide powder is pale yellow and widely applied to the materials for adhesives, coatings, moldings and laminates.

It can be easily molded to obtain desired articles by heating under increased pressure above the glass transition temperature of the polyimide. Stabilizers, pigments, plasticizers, lubricants and flame retardants may be added in the range of quantities which have no adverse effect on the polyimide properties.

The polyimide powder may, of course, be prepared by thermally imidizing the polyamic-acid. However, excellent melt flowability, high-temperature stability and adhesive strength are achieved by the combination of the specified polyamic-acid and the chemical imidization with the imidizing agents.

The polyimide powder is useful for the high-temperature stable adhesives. Bonding is performed by applying the polyimide powder onto the adherend surfaces to form an adhesive layer, assembling together the treated surfaces with the untreated or treated surfaces of other adherend, and heating under increased pressure. The polyimid powder can be applied by known methods, for example, direct scattering of the powder on the adherend surfaces with a spoon, or the use of electrostatic processes for uniform application. Besides the polyimide powder is applied by suspending into the organic solvents such as water, acetone, methanol, ethanol, propanol, benzene, xylene and other conventional solvents. When the solvents are used, it is prefered to remove the solvents before bonding the treated substrates.

Heating above the glass transition temperature of said polyimide is needed for the bonding to obtain a high adhesive strength. The range of temperatures which is suitable for the bonding is 180°–450° C. and preferably 250°–400° C. The heating and pressing in the present invention may be known processes such as hot pressing, hot rolling, high-frequency induction heating, double-belt pressing and autoclaving. A bonding pressure of 0–500 kg/cm$^2$ range is preferred.

The high adhesive strength can also be obtained by applying the polyimide powder, heating and melting to form the polyimide coat before bonding. This process is more preferable because the volatiles are more completely removed from the polyimide adhesive layer.

The bonded products thus obtained retains the high adhesive strength even at high temperatures.

In addition, the polyimide coat can be formed by applying the polyimide powder to the substrate surfaces, heating, and melting. The resulting coat can be in use for heat resistant coated films and also for the adhesive as described hereinbefore.

The polyimide coat can, of course, be prepared by applying the polyamic-acid solution and heating to remove the volatiles and to proceed the thermal imidization. In the method of this invention, however, almost no volatiles are contained in the polyimide powder and thus foaming does not occur even in a rapid heating. It is also advantageous that a thick film can be prepared by one operation.

The prepreg of the present invention is prepared by applying the polyimide powder to fibrous reinforcing materials, heating, melting, and impregnating the polyimide.

Typical fibrous reinforcing materials are glass fibers, carbon fibers, boron fibers, alumina fibers, polyamide fibers, and their textiles and non woven fabrics. These fibrous reinforcing materials are used alone or in combination. Other reinforcing materials such as silicone carbide fibers, mica, calcium silicate, silica and alumina can also be used, when needed, in combination with the fibers described hereinbefore.

Although the polyimide powder can be directly applied to the fibrous reinforcing materials, easier to operate is the method of application by suspending into the organic solvents.

Said polyimide powder is heated above the glass transition temperature of the polyimide and suitably at temperatures of 240°–360° C.

The fibrous reinforcing materials used in this invention can previously be impregnated by the polyamic-acid, imidized thermally and/or chemically, and used after removing the volatiles. The method can prepare the prepreg wherein the polyimide is thoroughly impregnated. The prepreg thus obtained is prefered to have a polymer content of 20–80% by weight.

The method of this invention wherein the polyimide powder is applied to the fibrous reinforcing materials, heating and melting to impregnate the polyimide, has the following advantages as compared with the conventional process wherein the polyamic-acid solution is impregnated, followed by heating to remove the solvents and to imidize the polymer. In the method of this invention, there exists almost no solvents and hence a large quantity of the polyimide can be impregnated in one operation, causing no need for repeated impregnation procedure. No troubles such as foaming are found on heating the prepreg. The prepreg containing almost no valatiles can be prepared, which eliminates blisters in the following stage of lamination molding or bonding. Besides the polyimide contained in the preparing of this invention has better melt flowability than that contained in the prepreg which is obtained by thermally imidizing the polyamic-acid, which makes the prepreg of this invention preferable for the materials of molded laminates and adhesives.

The molded laminates can be prepared by piling up the prepreg thus obtained and heating under increased pressure. The laminating temperature is above the glass transition temperature of the polyimide contained in the prepreg and preferably 240°–360° C. And the pressure is dependent upon the shape of products and preferably 1–500 kg/cm$^2$.

The prepreg of the present invention can be stored at room temperature. It is easy to process and products of any shape can be prepared by the use of conventional machines such as hot presses and autoclaves.

Said prepreg is also useful for adhesive sheets. Bonding is carried out by inserting the prepreg between the adherends and heating under increased pressure. The bonding pressure is 0–500 kg/cm$^2$ and the range of 0.1–20 kg/cm$^2$ is particularly preferred. The bonding temperature is above the glass transition temperature of polyimide contained in the prepreg and preferably 240°–360° C.

The method of heating under increased pressure can be carried out by known machines such as hot presses, hot rolls, high-frequency induction heating machines, double-belt presses, autoclaves etc. The bonded products thus obtained have excellent adhesive strengths even at high temperatures.

The invention will be illustrated further with respect to the following Specific Examples and Comparative Examples.

SPECIFIC AND COMPARATIVE EXAMPLES

EXAMPLE 1

(a) Polymerization

A 500 ml four necked flask was charged with 300 ml of N,N-dimethylacetamide and 31.85 grams (0.15 mole) of 3,3'-DABP. The solution was stirred in a dry nitrogen atmosphere at 15° C. and 48.33 grams (0.15 mole) of BTDA powder were gradually added. The viscosity of the solution increased jointly with the addition of BTDA. Afther the addition was finished, the stirring was further continued for 4 hours. The resulting polyamic-acid solution was pale brown and transparent, and the inherent viscosity of polyamic-acid was 0.73 dl/g at 35° C.

(b) Imidization and molding

A solution composed of 45.94 grams (0.45 mol) of acetic acid anhydride, 8.4 grams (0.09 mole) of $\beta$-picoline and 40 grams of N,N-dimethylacetamide was dropped with stirring under a dry nitrogen atmosphere at 20° C. into the polyamic-acid solution obtained in (a). After the end of the dropping, the resulting solution was further stirred for 6 hours to separate pale yellow polyimide, causing polyimide slurry. The slurry was filtered, washed with water and methanol, and dried in vacuum at 120° C. to obtain polyimide powder. The heating up temperature of the polyimide powder was 548° C. to 5% by weight loss.

(c) Adhesion test

The polyimide powder obtained in (b) was applied on one side of cold-rolled steel panel (JIS G-3141, SPCC, SD, 1.6×25×100 mm dimension). The treated surface of the panel was assembled together with an untreated surface of other pannel and bonded with a pressure of 5 kg/cm$^2$ at 330° C. The lap shear strength of adhesion is 285 kg/cm$^2$ at room temperature and 203 kg/cm$^2$ at 250° C. in accordance with JIS K-6848 and K-6850.

(d) Coat forming and adhesion test

The polyimide powder obtained in (b) was applied on cold-rolled steel sheet (JIS G-3141, SPCC, SD, 0.5×25×150 mm dimension), heated up to 295° C. and melted. The procedure was repeated twice to form a polyimide coat having a thickness of about 250 m.

The treated surface of the sheet was assembled together with an untreated surface of other sheet and bonded with a pressure of 5 kg/cm$^2$ at 330° C. The 180° peel strength obtained was 19 kg/25 mm at room temperature and 13.5 kg/25 mm at 250° C. in accordance with JIS K-6848 and K-6854.

EXAMPLE 2-6

The procedure of Example 1 was used to proceed polymerization and imidization of a variety of diamines and tetracarboxylic acid dianhydrides. The resulting polyimide resin powder was used for adhesion tests which led to the results illustrated in Table. 1.

TABLE 1

Examples 2-6

| Example | Tetracarboxylic acid dianhydride (mole) | Diamine (mole) | polyamic-acid inherent viscosity (dl/g) | Lap shear adhesive strength of bonded panels (kg/cm$^2$) | |
|---|---|---|---|---|---|
| | | | | (23° C.) | (250° C.) |
| 2 | BTDA 0.10<br>PMDA 0.05 | 3,3'-DADPS<br>0.15 | 0.79 | 221 | 166 |
| 3 | BTDA 0.075<br>PMDA 0.075 | 3,4'-DABP<br>0.15 | 1.2 | 155 | 143 |
| 4 | BDCMDA 0.15 | 3,3'-DABP<br>0.15 | 0.72 | 218 | 145 |
| 5 | BTDA 0.15 | 3,3'-DADPE<br>0.15 | 0.75 | 201 | 142 |
| 6 | BDCEDA 0.15 | 3,3'-DADPE<br>0.15 | 0.91 | 209 | 171 |

Note:
BTDA — Benzophenone tetracarboxylic acid dianhydride
PMDA — Pyromellitic dianhydride
BDCMDA — Bis(3,4-dicarboxyphenyl) methane dianhydride
BDCEDA — Bis(3,4-dicarboxyphenyl) ether dianhydride
3,3'-DADPS — 3,3'-Diaminodiphenylsulfone
3,4'-DABP — 3,4'-Diaminobenzophenone
3,3'-DABP — 3,3'-Diaminobenzophenone
3,3'-DADPE — 3,3'-Diaminodiphenylether The polyimide powder was molded in a hydraulic press at 350° C. with a pressure of 300 kg/cm$^2$. The molded product was dark brown, transparent, and tough. The product had a tensile strength of 9.5 kg/mm$^2$ at 23° C. in accordance with ASTM D-638, a flexural strength of 13 kg/mm$^2$ at 23° C. in accordance with ASTM D-790, and a notched izod impact strength of 3.8 kg. cm/cm$^2$ at 23° C. in accordance with ASTM D-256.

Compartive Examples 1-2

The procedure of Example 1 was used to prepare polyamic-acids by using diamines which do not form polyamic-acids of the present invention. The resulting polyamic-acids were further imidized chemically to obtain polyimide powder. The powder was used for adhesion tests which led to the results illustrated in Table 2.

TABLE 2

Comparative Examples 1-2

| Comparative example | Tetracarboxylic acid dianhydride (mole) | Diamine (mols) | Polyamic-acod inherent viscosity (dl/g) | Lap shear adhesive strength of bonded panels (kg/cm²) | |
|---|---|---|---|---|---|
| | | | | (23° C.) | (250° C.) |
| 1 | BTDA 0.15 | 4,4'-DABP 0.15 | 0.70 | 97 | 65 |
| 2 | PMDA 0.15 | 4,4'-DADPE 0.15 | 0.78 | 0 | 0 |

Note:
BTDA — Benzophenone tetracarboxylic acid dianhydride
PMDA — Pyromellitic dianhydride
4,4'-DABP — 4,4'-Diaminobenzophenone
4,4'-DADPE — 4,4'-Diamjnodiphenylether

Example 7

(a) Polymerization

A 500 ml four necked flask was charged with 300 ml of N,N-dimethylacetamide and 48.33 grams (0.15 mole) of BTDA. The solution was stirred in a dry nitrogen atmosphere, and a mixture of 21.33 grams (0.1 mole) of 3,3'-DABP and 12.4 grams (0.05 mole) of 3,3'-diaminodiphenylsulfone was gradually added. The viscosity of the solution increased jointly with the addition of the mixture. After the addition was finished, the stirring was further continued for 4 hours. The resulting polyamic-acid solution was pale brown and transparent, and had an inherent viscosity of 0.71 dl/g at 35° C.

(b) Imidization and molding

A 1,000 ml four necked flask was charged with a solution composed of 184 grams (1.8 moles) of acetic acid anhydride, 33.6 grams (0.36 mole) of β-picoline and 160 grams of N,N-dimethylacetamide, and then the polyamic-acid solution obtained in (a) was dropped into the solution with stirring at 20° C. After the dropping was finished, the resulting solution was further stirred for 1 hour to obtain pale yellow polyimide slurry. The slurry was filtered, washed with water and methanol, and dried in vacuum at 120° C. to obtain the polyimide powder. The heating up temperature of the powder was 548° C. to a 5% by weight loss. The polyimide powder was molded by the procedure described in Example 1 (b). The molded product had a tensile strength of 9.2 kg/mm² at 23° C., a flexural strength of 13.1 kg/mm² at 23° C., and a notched izod impact strength of 3.6 kg.cm/cm² at 23° C.

(c) Coat forming and adhesion test

The procedure of Example 1 (d) was used to form a coat on the cold-rolled steel sheet (JIS G-3141, SPCC, SD, 0.5×25×150 mm dimension) and the adhesion test was carried out. The 180° peel adhesive strength was 20 Kg/25 mm at room temperature and 12.5 kg/25 mm at 250° C.

Examples 8-11

The procedure of Example 7 was used to prepare polyimide powder from a variety of diamines and tetracarboxylic acid dianhydrides, and the resulting polyimide powder was used for adhesion tests which led to the results illustrated in Table 3.

TABLE 3

Examples 8-11

| Example | Tetracarboxylic acid dianhydride (mole) | Diamine (mole) | Polyamic-acid inherent viscosity (dl/g) | 180° peel adhesive strength of bonded sheets (Kg/25 mm) | |
|---|---|---|---|---|---|
| | | | | (23° C.) | (250° C.) |
| 8 | BTDA 0.10 BMDA 0.05 | 3,3'-DABP 0.15 | 0.80 | 14 | 10 |
| 9 | BTDA 0.15 | 3,3'-DADPM 0.15 | 1.1 | 13 | 8 |
| 10 | BTDA 0.15 | 3,4'-DABP 0.15 | 0.93 | 13.6 | 7.7 |
| 11 | BDCMDA 0.15 | 3,4'-DADPE 0.15 | 0.73 | 15 | 8.3 |

Note:
BTDA — Benzophenone tetracarboxylic acid dianhydride
PMDA — Pyromellitic dianhydride
BDCMDA — Bis(3,4-dicarboxyphenyl)methane dianhydride
3,3'-DABP — 3,3'-Diaminobenzophenone
3,4'-DABP — 3,4'-Diaminobenzophenone
3,3'-DADPM — 3,3'-Diaminodiphenylmethane
3,4'-DADPE — 3,4'-Diaminodiphenylether

Comparative Example 3

(a) Preparation of thermally imidized polyimide powder

The polymerizing method of Example 1 (a) was used to prepare the polyamic-acid solution. The inherent viscosity was 0.73 dl/g at 35° C. The polyamic-acid solution was poured into water with a vigorous stirring to separate polyamic-acid. The white powder was thermally imidized by heating in vacuum at 230° C. for 12 hours. The heating up temperature of the polyimide powder was 551° C. to a 5% by weight loss.

The polyimide powder was molded as described in Example 1. The molded product had a tensile strength of 4.9 kg/mm² at 23° C., a flexural strength of 6.9 kg/mm² at 23° C., and a notched izod impact strength of 2.0 kg/cm/cm² at 23° C. These properties were inferior to those of the present invention.

(b) Adhesion tests

The procedure of Example 1 (c) was used for the adhesion tests. The lap shear adhesive strength was 108 kg/cm² at room temperature and 95 kg/cm² at 250° C., which was remarkably inferior to those obtained by the method of this invention.

Example 12

(a) Polymerization

A 500 ml four necked flask was charged with 300 ml of N,N-dimethylacetamide and 31.8 grams (0.15 mole) of 3,3'-DABP. The solution was stirred in a dry nitrogen atmosphere at 15° C. and 48.33 grams (0.15 mole) of BTDA powder were gradually added. The viscosity of the solution increased jointly with the addition of BTDA. After the addition was finished, the stirring was further continued for 4 hours. The resulting polyamic-acid solution was pale brown and transparent, and had an inherent viscosity of 0.69 dl/g at 35° C.

(b) Preparation of polyimide powder

A solution composed of 45.94 grams (0.45 mole) of acetic acid anhydride, 8.4 grams (0.09 mole) of β-picoline and 40 grams of N,N-dimethylacetamide was dropped with stirring in a dry nitrogen atmosphere at 20° C. into the polyamic-acid solution obtained in (a). After the end of dropping, the resulting solution was further stirred for 6 hours to separate pale yellow polyimide. The polyimide was filtered from the solvent and imidizing agent, washed with water and methanol, and dried in vacuum at 120° C.

(c) Impregnation

The polyimide powder obtained in (b) was applied on glass fabric (WF-230 from Nitto Boseki). The fabric was heated up to 295° C., and the powder was melted and impregnated to obtain a polyimide impregnated Prepreg.

(d) Adhesion test

The resulting prepreg was inserted between a pair of cold-rolled steel panels (JIS G-3141, SPCC, SD, 1.6×25×100 mm dimension) and the panels were bonded with a pressure of 5 kg/cm² at 340° C. The lap shear strength of adhesion was 270 kg/cm² at room temperature.

(e) Molding

The prepreg obtained in (c) was molded in a hydraulic press at 350° C. with a pressure of 100 kg/cm². The resulting molded product was brown, perspective and tough. The product had a tensile strength of 10.6 kg/mm² at 23° C., a flexural strength of 14.3 kg/mm² at 23° C., and a notched izod impact strength of 4.2 kg cm/cm² at 23° C.

Example 13–17

The procedure of Example 12 was used to prepare polyimide powder from a variety of diamines and tetracarboxylic acid dianhydrides, and the resulting resin was used for molding and adhesion tests which led to the results illustrated in Table 4.

TABLE 4

Example 13-17

| Example | Tetracarboxylic acid dianhydride (mole) | Diamine (mole) | Polyamic-acid inherent viscosity (dl/g) | Tensile strength (23° C.) (kg/mm²) | Notched izod impact strength (23° C.) (kg.cm/cm²) | Flexural strength (23° C.) (kg/mm²) | Lap shear adhesive strength (23° C.) (kg/cm²) |
|---|---|---|---|---|---|---|---|
| 13 | BTDA 0.15 | 3,4'-DABP 0.15 | 0.70 | 8.7 | 2.8 | 10 | 220.5 |
| 14 | BTDA 0.15 | 3,3'-DADPE 0.15 | 0.68 | 8.0 | 3.0 | 9.5 | 198.5 |
| 15 | BTDA 0.15 | 3,3'-DADPS 0.15 | 0.75 | 8.9 | 3.5 | 11 | 240.3 |
| 16 | PMDA 0.15 | 3,3'-DABP 0 15 | 0.90 | 7.3 | 2.7 | 14 | 270.1 |
| 17 | BTCDA 0.15 | 3,3'-DABP 0.15 | 0.65 | 7.4 | 3.2 | 13 | 200.7 |

Note:
BTDA — Benzophenone tetracarboxylic acid dianhydride
PMDA — Pyromellitic dianhydride
BTCDA — Butanetetracarboxylic acid dianhydride
3,4'-DABP — 3,4'-Diaminobenzophenone
3,3'-DADPE — 3,3'-Diaminodiphenylether
3,3'-DADPS — 3,3'-Diaminodiphenylsulfone
3,3'-DABP — 3,3'-Diaminobenzophenone Comparative example 4

The procedure of Example 12 was used to prepare polyamic-acid solution having an inherent viscosity of 0.69 dl/g at 35° C. by reacting 3,3'-DABP with BTDA. N,N-dimethylacetamide was added to the solution so as to obtain 8% by weight of resin content. The glass fabric was dipped into the solution thus obtained and allowed to dry in air. This prodecure was repeated three times to obtain polyamic-acid containing prepreg. The prepreg obtained was dried at 100° C. for 1 hour, at 150° C. for 1 hour, at 180° C. for 1 hour, and at 220° C. for 3 hours to perform imidization and removal of volatile matter, which resulted in a polyimide containing prepreg.

(a) Molding

The resulting prepreg was laminated and molded by using a procedure in Example 12 (e). The molded product had a tensile strength of 6.1 kg/mm² at 23° C., a flexural strength of 7.0 kg/mm² at 23 °C., a notched izod impact strength of 2.4 kg.cm/cm² at 23° C. These properties were inferior to those of Example 12.

(b) Adhesion test

The procedure of Example 12 (d) is used for the adhesion tests by using the resulting prepreg. The lap shear adhesive strength of the adherend obtained was 101 kg/cm² at room temperature, which was less than a half as compared with that of Example 12.

Example 18

(a) Polymerization

A 500 ml four necked flask was charged with 300 ml of N,N-dimethylacetamide and 48.33 grams (0.15 mole) of BTDA. The solution was stirred in a dry nitrogen atmosphere, and a mixture of 21.33 grams (0.1 mole) of 3,3'-DABP and 12.4 grams (0.05 mole) of 3,3'-diaminodiphenylsulfone are gradually added. The viscosity of the solution was increased with the addition. After the addition was finished, the stirring was further continued for 4 hours. The resulting polyamic-acid solution was pale brown and transparent, and had an inherent viscosity of 0.67 dl/g at 35° C.

(b) Preparation of polyimide powder

A 1,000 ml four necked flask was charged with a solution composed of 184 grams (1.8 moles) of acetic acid anhydride, 33.6 grams (0.36 mole) of β-picoline and 160 grams of N,N-dimethylacetamide. To this solution, the polyamic-acid solution obtained in (a) was dropped with stirring at 20° C. After the end of the dropping, the stirring was further continued for 1 hour to obtain pale yellow polyimide. The polyimide was filtered from the solvent and imidizing agent, washed with water and methanol, and dried in vacuum at 120° C.

(c) Impregnation

The polyimide powder obtained in (b) was applied as described in Example 12 (c) on glass fabric (WF-230 from Nitto Boseki), heat melted and a polyimide impregnated prepreg was prepared.

(d) Adhesion test

The adhesion tests were conducted as described in Example 12 (d) to measure the lap shear strength of adhesion. The strength was 256 kg/cm² at room temperature.

(e) Molding

The prepreg obtained in (c) was laminated and molded as described in Example 12 (e). The molded product has a tensile strength of 10.2 kg/mm² at 23° C., a flexural strength of 14.8 kg/mm² at 23° C. and a notched izod impact strength of 3.7 kg.cm/mm² at 23° C.

Examples 19–22

The procedure of Example 18 was used to prepare polyimide powder from a variety of diamines and tetracarboxylic acid dianhydrides, and the resulting resin was used for molding and adhesion tests which led to the results illustrated in Table 5.

TABLE 5

Example 19–22

| Example | Tetracarboxylic acid dianhydride (mole) | Diamine (mole) | Polyamic-acid inherent viscosity (dl/g) | Tensile strength (23° C.) (kg/mm²) | Notched izod impact strength (23° C.) (kg.cm/cm²) | Flexural strength (23° C.) (kg/mm²) | Lap shear adhesive strength (23° C.) (kg/cm²) |
|---|---|---|---|---|---|---|---|
| 19 | BTDA 0.10 PMDA 0.05 | 3,3'-DABP 0.15 | 0.80 | 8.4 | 3.2 | 10.2 | 230.8 |
| 20 | BTDA 0.15 | 3,3'-DADPM 0.15 | 1.1 | 9.2 | 3.6 | 12.0 | 265.5 |
| 21 | BTDA 0.15 | 3,4'-DABP 0.15 | 0.93 | 8.7 | 3.3 | 9.0 | 251.3 |
| 22 | BDCMDA 0.15 | 3,4'-DADPE 0.15 | 0.73 | 7.4 | 2.8 | 9.5 | 202.6 |

Note:
BTDA — Benzophenone tetracarboxylic acid dianhydride
PMDA — Pyromellitic dianhydride
BDCMDA — Bis(3,4-dicarboxyphenyl) methane dianhydride
3,3'-DABP — 3,3'-Diaminobenzophenone
3,3'-DADPM — 3,3'-Diaminodiphenylmethane
3,4'-DABP — 3,4'-Diaminobenzophenone
3,4'-DADPE — 3,4'-Diaminodiphenylether

Example 23

The procedure of Example 12 was used to prepare a polyamic-acid solution having an inherent viscosity of 0.72 dl/g at 35° C. by reacting 3,3'-DABP with BTDA. N,N-dimethylacetamide was added to the solution so as to obtain 8% by weight of resin content. Carbon fabric (Torecacloth 6343 from Toray) was dipped into the solution thus obtained. The wet prepreg was allowed to dry in air, followed by further drying at 100° C. for 1 hour, at 150° C. for 30 minutes, and at 220° C. for 30 minutes. The prepreg thus obtained had a carbon filber content of 85% by volume.

Then, the polyimide powder obtained in Example 18 was further applied to the prepreg and impregnated by heat melting at 305° C. The resulting polyimide impregnated prepreg had a carbon fibre content of 60% by volume.

Molding

The prepreg thus obtained was laminated and molded as described in Example 12 (e). The molded product had a tensile strength of 73 kg/mm² at 23° C., a flexural strength of 81 kg/mm² at 23° C., and an interlaminar shear strength of 6.7 kg/mm² at 23° C.

ADHESION TESTS

The adhesion tests were conducted as described in Example 12 (d) by using the prepreg obtained. A lap shear adhesive strength of 271 kg/cm² was obtained at room temperature.

What is claimed is:

1. A polyimide powder for adhesion and/or coat forming, which comprises polyimide powder being obtained by chemically imidizing a polyamic-acid which is derived from 3,3'-diaminobenzopheonone and 3,3',4,4'-benzophenonetetracarboxylic dianhydride and has recurring unit of the formula (I):

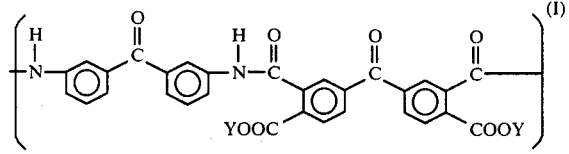

where Y is a member selected from the group consisting of hydrogen, alkyl and aryl, with an imidizing agent, and having recurring units of the formula (II):

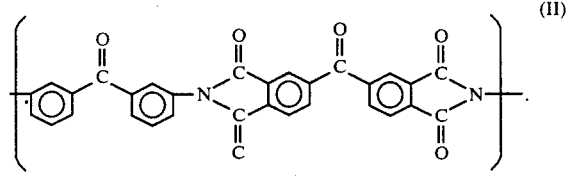

2. The polyimide powder of claim 1 for adhesion and/or coat forming wherein said imidizing agent is at least one agent being a member selected from the group consisting of acetic anhydride, propionic anhydride, isobutyric anhydride and butyric anhydride.

3. A method for preparing a polyimide powder for adhesion and/or coat forming, which comprises the polyimide powder being obtained by chemically imidizing a polyamic-acid which is derived from 3,3'-diaminobenzophenone and 3,3',4,4'-benzophenonetetracarboxylic dianhydride and has recurring units of the formula (I):

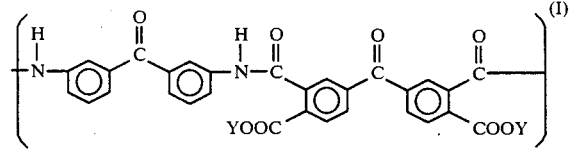

where Y is a member selected from the group consisting of hydrogen, alkyl and aryl, with an imidizing agent, and having recurring units of the formula (II):

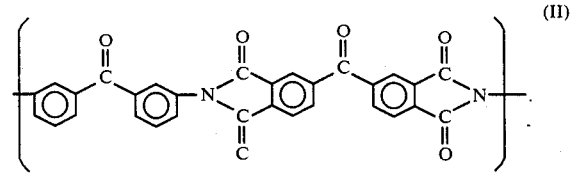

4. The method of claim 3 for preparing the polyimide powder for adhesion and/or coat forming wherein said imidizing agent is at least one agent being a member selected from the group consisting of acetic anhydride, propionic anhydride, isobutyric anhydride and butyric anhydride.

5. A method for adhesion with a polyimide powder, which comprises the polyimide powder being obtained by chemically imidizing a polyamic-acid which is derived from 3,3'-diaminobenzophenone and 3,3',4,4'-benzophenonetetracarboxylic dianhydride and has recurring units of the formula (I):

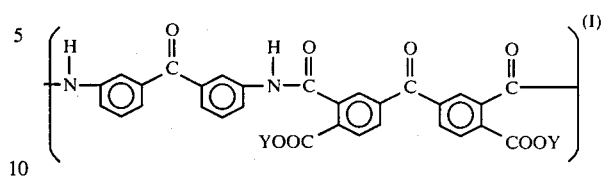

where Y is a member selected from the group consisting of hydrogen, alkYl and arYl, with an imidizing agent, and having recurring units of the formula (II):

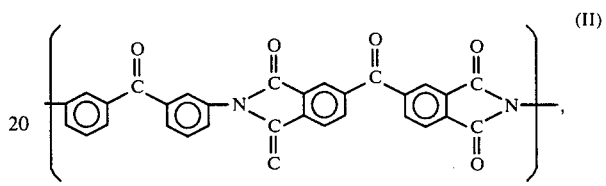

and including the further steps of applying said polyimide powder to adherent surfaces, assembling together the treated surfaces with untreated or treated surfaces of another adherents, and heating under increased pressure above the glass transition temperature of the polyimide powder.

6. The method of claim 5 for adhesion wherein said polyimide powder on the adherent surfaces melts and forms a coat.

7. The method of claims 5 or 6 for adhesion wherein said imidizing agent is at least one agent being a member selected from the group consisting of acetic anhydride, propionic anhydride, isobutyric anhydride and butyric anhydride.

8. A method for forming a coat with a polyimide powder, which comprises the polyimide powder being obtained by chemically imidizing a polyamic-acid which is derived from 3,3'-diaminobenzophenone and 3,3',4,4'-benzophenonete has recurring units of the formula (I):

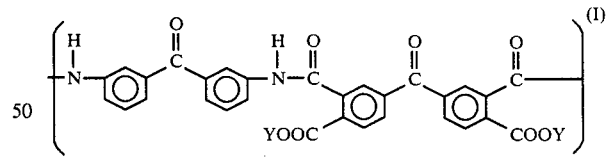

where Y is a member selected from the group consisting of hydrogen, alkyl and aryl, with an imidizing agent, and having recurring units of the formula (II):

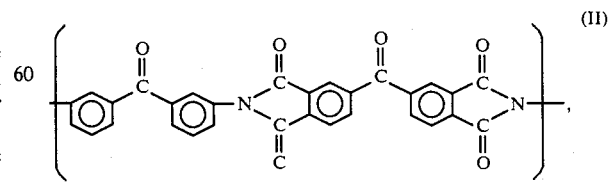

; including the further steps of applying said polyimide powder to adherend surfaces, heating and melting above the glass transition temperature of the polyimide.

9. The method of claim 8 for forming a coat wherein said imidizing agent is not less than one agent selected from the group consisting of acetic anhydride, propionic anhdyride, isobutyric anhydride and butyric anhydride.

10. A method for preparing prepreg of a polyimide powder, which comprises the polyimide powder being obtained by chemically imidizing a polyamic-acid which is derived from 3,3'-diaminobenzophenone and 3,3',4,4'-benzophenonetetracarboxylic dianhydride and has the recurring units of the formula (I):

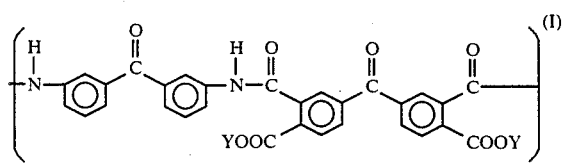

where Y is a member selected from the group oonsisting of hydrogen, alkyl and aryl groups, with an imidizing agent and having recurring units of the formula (II):

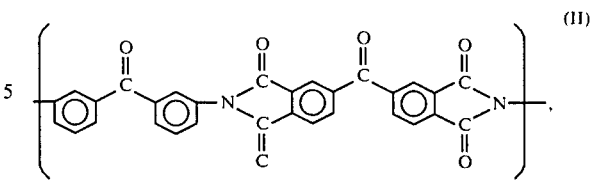

and further including the steps of applying the polyimide powder to a fibrous reinforcing material, heating above the glass transition temperature of the polyimide, melting and impregnating the polyimide powder.

11. The method of claim 10 for preparing prepreg wherein said fibrous reinforcing material contains the polyimide obtained by thermally or chemically imidizing the polyamic-acid which is previously impregnated as an organic solvent solution.

12. The method of claim 10 or 11 for preparing prepreg wherein an imidizing agent of said polyamic-acid is not less than one agent being a member selected from the group consisting of acetic anhydride, propionic anhydride, isobutyric anhydride and butyric anhydride.

13. The method for preparing a molded laminate which comprises piling up said prepreg according to claims from 10 to 12, and heating under increased pressure above the glass transition temperature of the polyimide contained in said prepreg.

14. The method for adhesion which comprises inserting said prepreg according to claims from 10 to 12 between adherents, and heating under increased pressure above the glass transition temperature of the polyimide contained in said prepreg.

* * * * *